(12) United States Patent
    Avital et al.

(10) Patent No.: US 9,516,010 B1
(45) Date of Patent: Dec. 6, 2016

(54) AUTHENTICATING A USER WHILE THE USER OPERATES A CLIENT APPARATUS AND POSSESSES AN ELECTRONIC CARD

(71) Applicant: EMC Corporation, Hopkinton, MA (US)

(72) Inventors: Aviv Avital, Be'er Sheva (IL); Evgeny Mayzel, Be'er Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 42 days.

(21) Appl. No.: 14/561,640

(22) Filed: Dec. 5, 2014

(51) Int. Cl.
   *H04L 9/32* (2006.01)
   *H04L 29/06* (2006.01)
   *H04L 12/911* (2013.01)
   *H04W 4/00* (2009.01)

(52) U.S. Cl.
   CPC .............. *H04L 63/08* (2013.01); *H04L 47/70* (2013.01); *H04W 4/008* (2013.01)

(58) Field of Classification Search
   CPC ... H04L 63/08; H04L 63/10; H04L 63/0853; H04L 63/0869; G06F 21/31; G06F 21/34; G06F 21/44; G06F 21/445; G07F 7/1016; G06Q 20/367; G06Q 20/3672; G06Q 20/3674
   USPC ........ 726/2–7, 9, 16–21; 713/168, 170, 172; 705/65–67, 75–78
   See application file for complete search history.

(56) References Cited

U.S. PATENT DOCUMENTS

| | | | |
|---|---|---|---|
| 8,494,959 B2 | 7/2013 | Hathaway et al. | |
| 8,566,239 B2 * | 10/2013 | Arthur | G06Q 20/105 705/41 |
| 8,618,913 B1 | 12/2013 | Bailey et al. | |
| 8,656,455 B1 | 2/2014 | Bailey et al. | |
| 8,683,563 B1 | 3/2014 | van Dijk et al. | |
| 8,774,410 B1 | 7/2014 | Juels | |
| 8,792,862 B1 | 7/2014 | Juels | |
| 8,850,609 B1 | 9/2014 | Juels | |
| 8,855,312 B1 | 10/2014 | Hodgman et al. | |
| 8,880,027 B1 | 11/2014 | Darringer | |
| 8,934,940 B1 | 1/2015 | Juels | |
| 8,939,355 B2 * | 1/2015 | Grossman | G06Q 30/06 235/375 |
| 8,977,847 B1 | 3/2015 | Juels | |
| 9,021,563 B2 * | 4/2015 | Ying | H04W 12/04 726/5 |
| 9,043,605 B1 | 5/2015 | Machani | |
| 9,106,615 B2 * | 8/2015 | Grossman | H04L 63/0407 |
| 9,119,069 B1 | 8/2015 | Vipond et al. | |
| 9,154,481 B1 | 10/2015 | Juels et al. | |
| 2015/0058213 A1 * | 2/2015 | Lee Kim-Koon | G06Q 20/3278 705/41 |

* cited by examiner

*Primary Examiner* — Hosuk Song
(74) *Attorney, Agent, or Firm* — BainwoodHuang (57) ABSTRACT

A technique perform authentication. The technique involves receiving an authentication request from a user operating a client apparatus (e.g., the user's smart phone). The technique further involves performing, in response to the authentication request, an analysis of a set of credentials obtained from the client apparatus. The set of credentials includes an authentication factor acquired by the client apparatus from an electronic card in possession of the user (e.g., an integrated circuit credit card). The electronic card is separate from the client apparatus. The technique further involves outputting, based on the analysis of the set of credentials, an authentication result indicating whether the processing circuitry deems the user operating the client apparatus to be authentic.

20 Claims, 5 Drawing Sheets

AUTHENTICATING A USER WHILE THE USER OPERATES A CLIENT APPARATUS AND POSSESSES AN ELECTRONIC CARD

BACKGROUND

Conventional risk-based authentication includes an evaluation of multiple authentication factors to determine whether a human using a computer is authentic, i.e., not an imposter. In particular, a risk engine takes, as inputs, authentication factors such as username and password, time of day, IP address, and geolocation and outputs a risk score, i.e., a numerical value or measure indicating a likelihood that the human is an imposter.

If the risk score is less than a predetermined risk score threshold, authentication is considered successful, i.e., the human using the computer is considered to be authentic. However, if the risk score exceeds the predetermined risk score threshold, authentication is considered unsuccessful.

SUMMARY

An improvement to conventional risk-based authentication involves authenticating a user while the user operates a client apparatus (e.g., the user's smart phone) and possesses an electronic card (e.g., an integrated circuit credit card). Such authentication is based, at least in part, on an electronic card credential which is supplied by the user when the user scans the electronic card using the client apparatus. For example, during an authentication session, the user may provide a device fingerprint from the client apparatus (i.e., "something you are"), a personal identification number or PIN (i.e., "something you know"), and an electronic credential from an integrated circuit credit card (i.e., "something you have") to provide a significantly strong form of authentication. Moreover, use of an electronic card credential which utilizes the EMV standard (i.e., the Europay, MasterCard®, and Visa® standard for inter-operation of IC credit cards) can provide a rich and reliable mechanism for user authentication even to access protected resources of a non-financial nature.

One embodiment is directed to a method of performing authentication. The method includes receiving, by processing circuitry, an authentication request from a user operating a client apparatus. The method further includes performing, in response to the authentication request and by the processing circuitry, an analysis of a set of credentials obtained from the client apparatus. The set of credentials includes an authentication factor acquired by the client apparatus from an electronic card in possession of the user. The electronic card is separate from the client apparatus. The method further includes outputting, based on the analysis of the set of credentials and by the processing circuitry, an authentication result indicating whether the processing circuitry deems the user operating the client apparatus to be authentic.

In some arrangements, the client apparatus is a smart phone operated by the user. The smart phone has near field communication circuitry. In these arrangements, performing the analysis of the set of credentials includes: (i) obtaining, as the authentication factor acquired by the client device from the electronic card, a mobile payment credential from the electronic card via the near field communication circuitry of the smart phone, and (ii) verifying the mobile payment credential against an expected mobile payment credential assigned to the user.

In some arrangements, performing the analysis of the set of credentials further includes receiving, prior to obtaining the mobile payment credential from the electronic card, an initial set of credentials from the client apparatus and performing an initial authentication operation based on the initial set of credentials. In these arrangements, performing the analysis further includes providing, in response to a result of the initial authentication operation indicating that authentication of the user is unsuccessful and prior to obtaining the mobile payment credential from the electronic card, a scan command to the smart phone to direct the user to scan the electronic card using the near field communication circuitry of the smart phone.

In some arrangements, performing the initial authentication operation includes performing, as the initial authentication operation, (i) a risk-based authentication operation using, as input, the initial set of credentials to generate a risk score, and (ii) comparing the risk score to a risk score threshold. In these arrangements, the scan command directs the user to scan the electronic card being provided to the smart phone in response to the risk score exceeding the risk score threshold.

In some arrangements, the initial set of credentials includes a user identifier which uniquely identifies the user among other users, a user password, and a set of smart phone parameters provided by the smart phone. In these arrangements, performing the risk-based authentication operation includes inputting the user identifier, the user password, and the set of smart phone parameters into a risk engine to produce, as the risk score, a numerical value indicating an amount of riskiness that the user is not authentic.

In some arrangements, performing the analysis of the initial set of credentials further includes, after verifying the mobile payment credential against the expected mobile payment credential assigned to the user, providing a password command to the smart phone to direct the user to provide a step-up authentication password which is different from the user password. In these arrangements, performing the analysis further includes comparing the step-up authentication password to an expected password to determine whether the user operating the client apparatus is authentic.

In some arrangements, the electronic card is constructed and arranged to provide the mobile payment credential to point of sale apparatus in a wireless manner during in-store purchases by the user (e.g., EMV-compliant communications to complete an EMC-compliant transaction). In these arrangements, obtaining the mobile payment credential from the electronic card includes acquiring the mobile payment credential from the electronic card in the wireless manner via the near field communication circuitry of the smart phone in lieu of the point of sale apparatus. Accordingly, the improved techniques described herein are well-suited for user authentication for accessing any protected resources even non-financial resources.

In some arrangements, the processing circuitry receives the authentication request from the user in response to an attempt by the user to access a protected resource via the smart phone. In these arrangements, the method further includes: (i) granting access to the protected resource when the authentication result indicates successful user authentication, and (ii) denying access to the protected resource when the authentication result indicates unsuccessful user authentication.

In some arrangements, the authentication result indicates successful user authentication, and granting access to the protected resource includes providing the user with access to a smart phone resource contained within the smart phone. Examples of suitable smart phone resources include login access, access to a particular smart phone component such as cell phone circuitry or a camera, access to a smart phone app, access to a calendar, a contact list, a photo library, a music library, a document, a game, a database, and so on.

In some arrangements, the authentication result indicates successful user authentication, and granting access to the protected resource includes providing the user with access to a remote resource residing on a third party server which is located remotely from the smart phone. Examples of suitable remote resources include login access to a remote server, VPN access, access to a remote application, access to remote content such as a calendar, a contact list, a photo library, a music library, a document, a game, a database, etc. Furthermore, such user authentication can be provided for step-up authentication (i.e., if normal authentication is unsuccessful), to complete a transaction, to extend a remote user session, and so on.

Another embodiment is directed to an electronic apparatus which includes a network interface, memory, and processing circuitry coupled to the network interface and the memory. The memory stores instructions which, when carried out by the processing circuitry, causes the processing circuitry to:
  (A) receive an authentication request through the network interface from a user operating a client apparatus,
  (B) in response to the authentication request, perform an analysis of a set of credentials obtained from the client apparatus, the set of credentials including an authentication factor (i) acquired by the client apparatus from an electronic card in possession of the user and (ii) sent to the electronic apparatus from the client apparatus, the electronic card being separate from the client apparatus, and
  (C) based on the analysis of the set of credentials, output an authentication result indicating whether the processing circuitry deems the user operating the client apparatus to be authentic.

Yet another embodiment is directed to a computer program product having a non-transitory computer readable medium which stores a set of instructions to perform authentication. The set of instructions, when carried out by computerized circuitry, causes the computerized circuitry to perform a method of:
  (A) receiving an authentication request from a user operating a client apparatus;
  (B) in response to the authentication request, performing an analysis of a set of credentials obtained from the client apparatus, the set of credentials including an authentication factor acquired by the client apparatus from an electronic card in possession of the user, the electronic card being separate from the client apparatus; and
  (C) based on the analysis of the set of credentials, outputting an authentication result indicating whether the processing circuitry deems the user operating the client apparatus to be authentic.

It should be understood that, in the cloud context, the electronic circuitry described herein is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in authenticating a user while the user operates a client apparatus and possesses an electronic card such as an integrated circuit credit card.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques are directed to authenticating a user while the user operates a client apparatus (e.g., the user's smart phone) and possesses an electronic card (e.g., an integrated circuit credit card). Such authentication is based, at least in part, on an electronic card credential which is supplied by the user when the user scans the electronic card using the client apparatus (e.g., using near field communications circuitry within the user's smart phone). Along these lines, during an authentication session, the user may provide a device fingerprint from the client apparatus (i.e., "something you are"), a personal identification number or PIN (i.e., "something you know"), and an electronic credential from an integrated circuit credit card (i.e., "something you have") to provide a significantly strong form of authentication. Moreover, use of an electronic card credential which employs the EMV standard (i.e., the Europay, MasterCard®, and Visa® standard for inter-operation of IC credit cards) can provide a rich and reliable mechanism for user authentication even for accessing protected resources of a non-financial nature.

Figure 1:
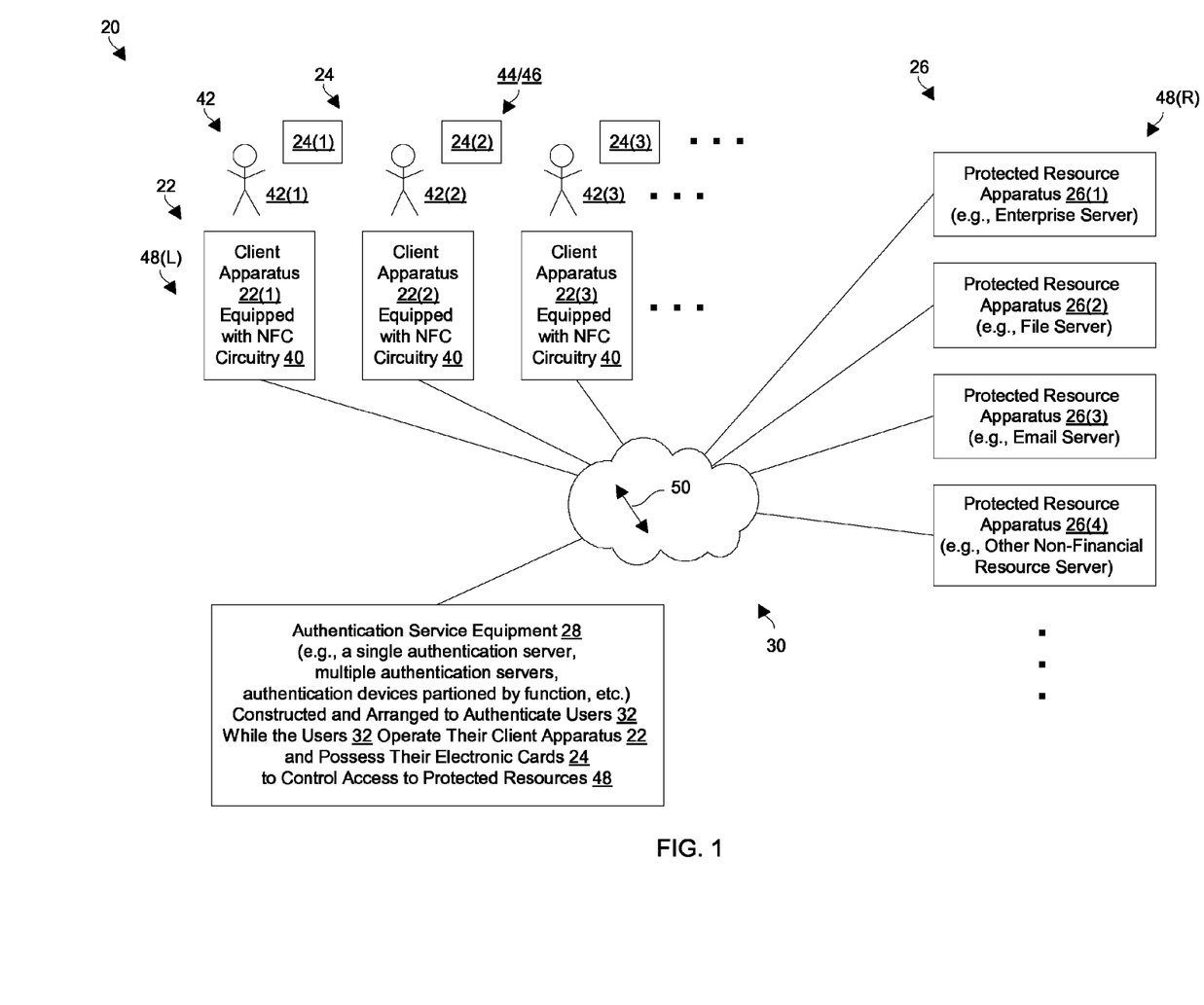
FIG. 1 is a block diagram of an electronic environment which is suitable for use in authenticating a user while the user operates a client apparatus and possesses an electronic card such as an integrated circuit credit card.

FIG. 1 shows an electronic environment 20 which is suitable for authenticating users while the users operate respective client apparatus and possess respective electronic cards such as IC credit cards. The electronic environment 20 includes client apparatus 22(1), 22(2), 22(3), . . . (collectively, client apparatus 22), electronic cards 24(1), 24(2), 24(3), . . . (collectively, electronic cards 24), protected resource apparatus 26(1), 26(2), 26(3), 26(4), . . . (collectively, protected resource apparatus 26), authentication service equipment 28, and communications medium 30.

Each client apparatus 22 is equipped with near field communications (NFC) circuitry 40 and is controlled and operated by a respective user 42 to enable that user 42 to perform useful work. A suitable client apparatus 22 is a smart phone or a similar portable device (e.g., a tablet) which, in addition to the NFC circuitry 40, is provisioned with various electronic components (e.g., cellular phone circuitry, a camera, Bluetooth circuitry, WiFi circuitry, a touch screen, etc.), an operating system, user-level applications, stored data, and so on.

Each electronic card 24 is likewise equipped with NFC circuitry 44 to communicate with the NFC circuitry 40, and is in possession of a respective user 42. A suitable electronic card 24 is a chip card (e.g., an IC credit card, smart card or NFC tag with a similar form factor) which holds unique card credentials 46 on behalf of the respective user 42. An example of such a chip card is an EMV-compliant card which can be used to make payments when scanned by EMV card readers at point of sale (POS) locations such as physical retail stores, restaurants, gasoline stations, automatic teller machines, etc. Other NFC-equipped cards and NFC-card systems are suitable for use as well such as those for PayPass, payWave, ExpressPay, and so on.

Accordingly, as shown in FIG. 1, the client apparatus 22(1) is controlled by the user 42(1), and the electronic card 24(1) is in possession of the user 42(1). Similarly, the client apparatus 22(2) is controlled by the user 42(2), and the electronic card 24(2) is in possession of the user 42(2). Likewise, the client apparatus 22(3) is controlled by the user 42(3), and the electronic card 24(3) is in possession of the user 42(3), and so on.

Each protected resource apparatus 26 is constructed and arranged to provide users 42 with access to one or more remote protected resources 48(R) upon successful authentication of the users 42 by the authentication service equipment 28. For example, the protected resource apparatus 26(1) may be a physical enterprise server which provides members of the enterprise with certain services such as virtual private network (VPN) access, enterprise database access, access to engineering designs, access to sales department data, and so on. As a second example, the protected resource apparatus 26(2) may be a physical file server which provides access to files (documents, applications, photos, movies, webpages, etc.) of one or more file systems or file repositories. As a third example, the protected resource apparatus 26(3) may be a physical email file server which provides access to email messages. The protected resource apparatus 26(4) may be another physical server which provides access to other protected resources such as games, streaming content, general login access and account information, data storage system access, access to privileges and the ability to perform transactions, other non-financial resources, financial resources, and so on.

It should be understood that some remote protected resources 48(R) may be distributed in nature or involve circuitry at more than one location (e.g., cloud resources, device clusters, server farms, etc.). Furthermore, other protected resources 48(L) may be provided locally such as by the client apparatus 22 (e.g., login access, access to components such as a cellular phone or a camera, local database access, local application access, etc.).

The authentication service equipment (or the simply authentication server) 28 is constructed and arranged to authenticate the users 42 (e.g., a single authentication server, a farm of servers, devices partitioned by function, etc.) while the users 42 operate their client apparatus 22 and possess their electronic cards 24. Such authentication may be required for the users 42 to access certain protected resources 48 such as protected resources 48(L) which are locally provided by the client apparatus 22 and remote protected resources 48(R) such as those provided by the various protected resource apparatus 26.

The communications medium 30 is constructed and arranged to connect the various components of the electronic environment 20 together to enable these components to exchange electronic signals 50 (e.g., see the double arrow 50). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, the users 42 operate their respective client apparatus 22 to perform useful work. In order to access certain protected resources 48 (e.g., local protected resources 48(L) such as mobile apps on the client apparatus 22, remote protected resources 48(R) such as those on protected resource apparatus 26, etc.), the users 42 must successfully authenticate to the authentication server 28. Such authentication can be carried out in a rich and robust manner after the users 42 appropriately enroll, and after the authentication server 28 is configured to expect card credentials 46 uniquely from the users 42 because these card credentials have been securely and properly deployed within the electronic cards 24 possessed by the users 42. Along these lines, each user 42 can be issued an electronic card 24 with a unique card credential 46 to enable that user 42 to properly authenticate with the authentication server 28.

For example, suppose that the card credentials 46 held by the electronic cards 24 are used as authentication factors for step-up authentication by the users 42. That is, each user 42 may routinely authenticate with the authentication server 28 by providing a set of authentication factors which does not include a card credential 46 held within the electronic card 24 possessed by that user 42.

However, under certain higher-risk circumstances, that user 42 may be further challenged to provide the card credential 46 as well as other authentication factors for step-up authentication. Such higher-risk circumstances can be defined by policy and may include attempted access from a geolocation or using an IP address identified as being unsafe, reaching a certain number of failed attempts to authenticate via normal authentication, attempting to complete a high-risk transaction, and so on.

In such a situation, the user 42 holds the electronic card 24 close to or in contact with the user's client apparatus 22 so that the NFC circuitry 40 of the client apparatus 22 properly communicates with the NFC circuitry 44 of the electronic card 24. As a result, the user's client apparatus 22 obtains the card credential 46 from the electronic card 24 via NFC, and conveys the obtained electronic credential 46 from the user's client apparatus 22 to the authentication server 28 to authenticate the user 42.

It should be understood that the near field communications carried out between the user's client apparatus 22 and the electronic card 24 can be conducted securely. For example, in some arrangements, the NFC circuitry 40, 44 communicates using the EMV protocol. Other mechanisms are suitable as well such as via an initial key exchange and then using standard wireless cryptography.

Upon receipt of the card credential 46 from the user's client apparatus 22, the authentication server 28 performs an authentication operation to determine whether the user 42 is genuine. Such a process involves comparing the card credential 46 with a locally-stored or native card credential which is expected for that user 42. When authentication is successful, the authentication server 28 grants the user 42 access to the protected resource 48 (e.g., provides an appropriate access control signal to the user's client apparatus 22 and/or the protected resource apparatus 26 allowing the user 42 to access the protected resource 48).

However, when authentication is unsuccessful, the authentication server 28 denies the user 42 access to the protected resource 48 (e.g., provides an appropriate access control signal to the user's client apparatus 22 and/or the protected resource apparatus 26 preventing the user 42 from accessing the protected resource 48). Additionally, the authentication server 28 can impose or follow a predefined policy to handle failed authentication (e.g., allow the user 42 to retry authentication a predefined number of times, lockout the user 42 following a predefined number of failed authentication attempts, sound an alarm/alert, other remedial actions, etc.). Further details will now be provided with reference to FIG. 2.

Figure 2:
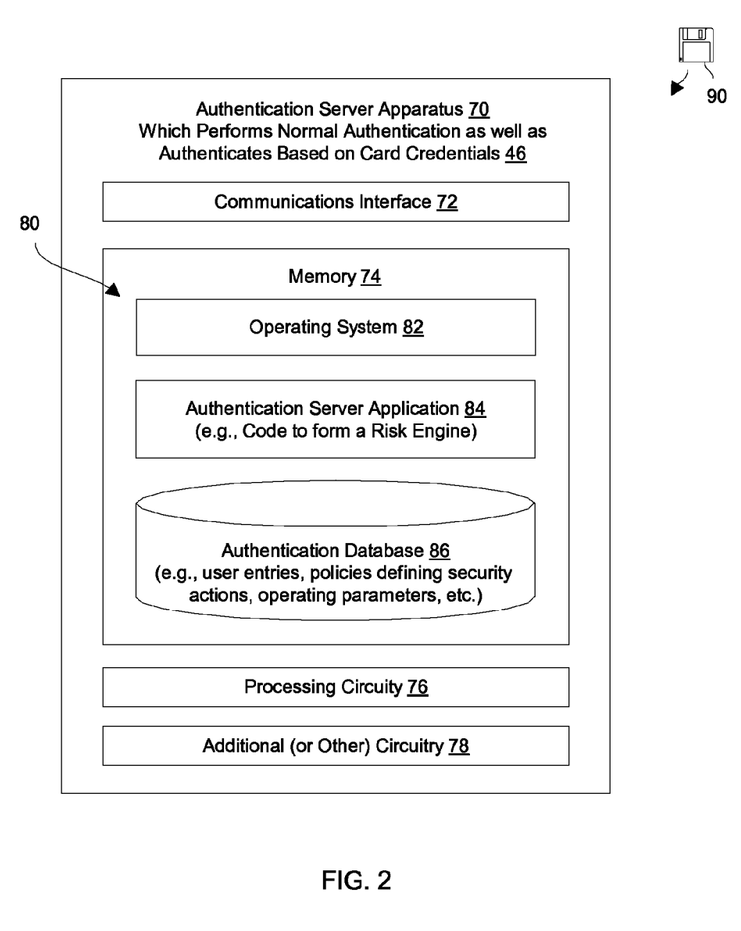
FIG. 2 is a block diagram of an authentication server apparatus of the electronic environment of FIG. 1.

FIG. 2 shows particular details of an authentication server apparatus 70 which is suitable for forming all or part of the authentication service equipment 28 of the electronic environment 20 (also see FIG. 1). The authentication server apparatus 70 includes a communications interface 72, memory 74, processing circuitry 76, and additional (or other) circuitry 78.

The communications interface 72 is constructed and arranged to connect the authentication server apparatus 70 to the communications medium 30 to enable communications with other components of the electronic environment 20 (FIG. 1). Such communications may be IP-based, cellular-based, cable-based, combinations thereof, and so on. Accordingly, the communications interface 72 enables the authentication server apparatus 70 to communicate with the client apparatus 22 and the protected resource apparatus 26 to perform user authentication, to control access to protected resources 48, and so on.

The memory 74 is intended to represent both volatile storage (e.g., DRAM, SRAM, etc.) and non-volatile storage (e.g., flash memory, etc.). The memory 74 stores a variety of software constructs 80 including an operating system 82 to manage resources of the authentication server apparatus 70, a specialized authentication server application 84 to perform user authentication (e.g., to form a risk engine), and an authentication database 86 to store information for effective and efficient authentication and access control. The authentication database 86 includes entries associated with the users 42 (e.g., user identifiers, user profiles, authentication factors and parameters including expected card credentials, etc.), policies defining security actions (e.g., rules and privileges identifying which protected resources 48 the users 42 are allowed to access upon successful authentication, rules defining remedial actions in response to failed authentication, etc.), and other operating parameters (e.g., risk engine details and machine learning logic, authentication statistics, configuration data, etc.).

The processing circuitry 76 is constructed and arranged to operate in accordance with the various software constructs 80 stored in the memory 74. Such circuitry 76 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the authentication server apparatus 70. The computer program product 90 has a non-transitory (or non-volatile) computer readable medium which stores a set of instructions which controls one or more operations of the authentication server apparatus 70. Examples of suitable computer readable storage media include tangible articles of manufacture and apparatus which store instructions in a non-volatile manner such as CD-ROM, flash memory, disk memory, tape memory, and the like.

The additional circuitry 78 represents other portions of the authentication server apparatus 70. Along these lines, the authentication server apparatus 70 may include a user interface to enable a special user such as a human administrator to enter input and receive output (user I/O) to operate the authentication server apparatus 70 such as for user enrollment, for electronic card deployment, for maintenance, for risk-based authentication teaching purposes, to respond to alarms/alerts, and so on.

During operation, the processing circuitry 76 runs the authentication server application 84 to form specialized control circuitry to perform various authentication server operations, e.g., to form a risk engine. That is, when the processing circuitry 76 runs the authentication server application 84, the specialized control circuitry performs authentication operations to authenticate the users 42 of the client apparatus 22.

It should be understood that the users 42 may be required to properly enroll prior to authenticating with the authentication server apparatus 70. In particular, the users 42 setup entries in the authentication database 86 and obtain their respective electronic cards 24 which hold their unique card credentials 46. In some arrangements, this setup process is performed manually by a human administrator. In other arrangements, this setup process is performed substantially automatically (e.g., via online enrollment). Other enrollment approaches (e.g., hybrid enrollment processes) are suitable as well. Further user experience details will now be provided with reference to FIGS. 3A through 3D.

Figure 3A:
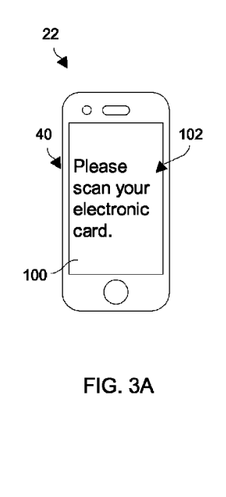
FIG. 3A is a first perspective view of a client apparatus during a sequence of user operations.
Figure 3B:
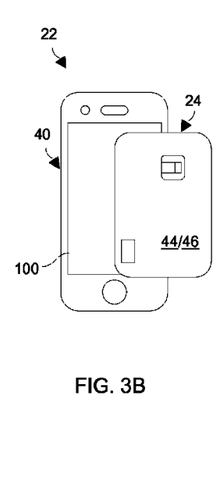
FIG. 3B is a second perspective view of the client apparatus during the sequence of user operations.
Figure 3C:
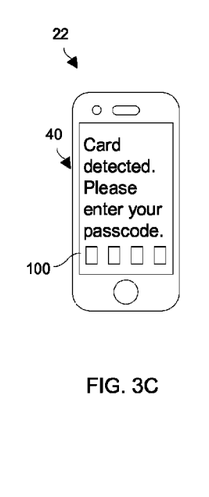
FIG. 3C is a third perspective view of the client apparatus during the sequence of user operations.
Figure 3D:
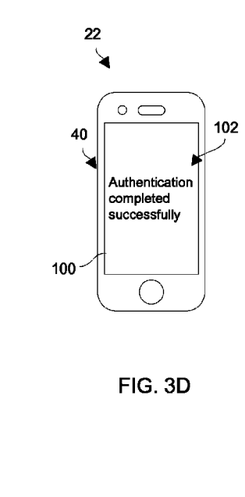
FIG. 3D is a fourth perspective view of the client apparatus during the sequence of user operations.

FIGS. 3A through 3D show how a user 42 interacts with the user's client apparatus 22 and electronic card 24 to provide a card credential 46 from the electronic card 24 to the authentication service equipment 28 via the client apparatus 22 as part of the process of authenticating in order to access a protected resource 48. In particular, FIG. 3A shows the client apparatus 24 at an initial point in a sequence of operations. FIGS. 3B, 3C, and 3D show the client apparatus 24 at subsequent points in the sequence of operations. By way of example, the client apparatus 22 has the form factor of a typical smart phone which is equipped with, among other things, NFC circuitry 40 and a touch screen 100 for user input/output (I/O).

As shown in FIG. 3A, the client apparatus 22 initially directs the user 42 to scan the electronic card 24 that is in possession of the user 42. In particular, the touch screen 100 outputs instructions 102 to the user 42 directing the user 42 to scan the electronic card 24 using the client apparatus 22. Such outputting of the instructions 102 can be performed by the client apparatus 22 in response to a scan command that the client apparatus 22 receives from the authentication service equipment 28.

Recall that the electronic card 24 is provisioned with NFC circuitry 44 to enable pairing with the client apparatus 22 via near field communications. Additionally, as shown in FIG. 1, the client apparatus 22 is able to communicate with the authentication service equipment 28 through the communications medium 30 (e.g., via cellular communications, via IP communications, etc.).

After the instructions 102 are provided to the user 42, the user 42 scans the electronic card 24 using the client apparatus 22 as shown in FIG. 3B. In particular, the user 42 places the electronic card 24 in close proximity to the client apparatus 22 (e.g., within a few inches) to enable the NFC circuitry 40, 44 to properly interact (e.g., so that the NFC circuitry 44 of the electronic card 24 is able to derive energy from the client apparatus 22, to exchange handshaking signals for secure communications, etc.). The client apparatus 22 then electronically reads the card credential 46 from the electronic card 24 and conveys that card credential 46 to the authentication service equipment 28 through the communications medium 30 (FIG. 1). In some arrangements, the electronic card 24 and the client apparatus 22 communicate with each other in accordance with the EMV-standard.

Then, as shown in FIG. 3C, the client apparatus 22 directs the user 42 to enter a password which is associated with authentication using the electronic card 24 (i.e., not necessarily a password associated with making purchases or payments using the electronic card 24). Such activity can be performed by the client apparatus 22 in response to a password command that the client apparatus 22 receives from the authentication service equipment 28. In some arrangements, the touch screen 100 of the client apparatus 22 renders an alphanumeric keypad and a send button to facilitate user entry of the password. Additionally, in some arrangements, when the electronic card 24 serves and additional purpose of acting as a payment card (e.g., electronic credit card, an e-wallet or e-purse, etc.), the password provided for authentication to the authentication service equipment 28 is different than the PIN that is used to make payment card transactions in order to provide additional security.

If authentication based on the card credential 46 is successful, the client apparatus 22 outputs a success message 102 to the user 42 as shown in FIG. 3D. This success message 102 indicates to the user 42 that the user 42 is now able to access the protected resource 48.

If authentication based on the card credential 46 is unsuccessful, the client apparatus 22 outputs a failure message to the user 42. In this situation, the user 42 is denied access the protected resource 48. Further details will now be provided with reference to FIG. 4.

Figure 4:
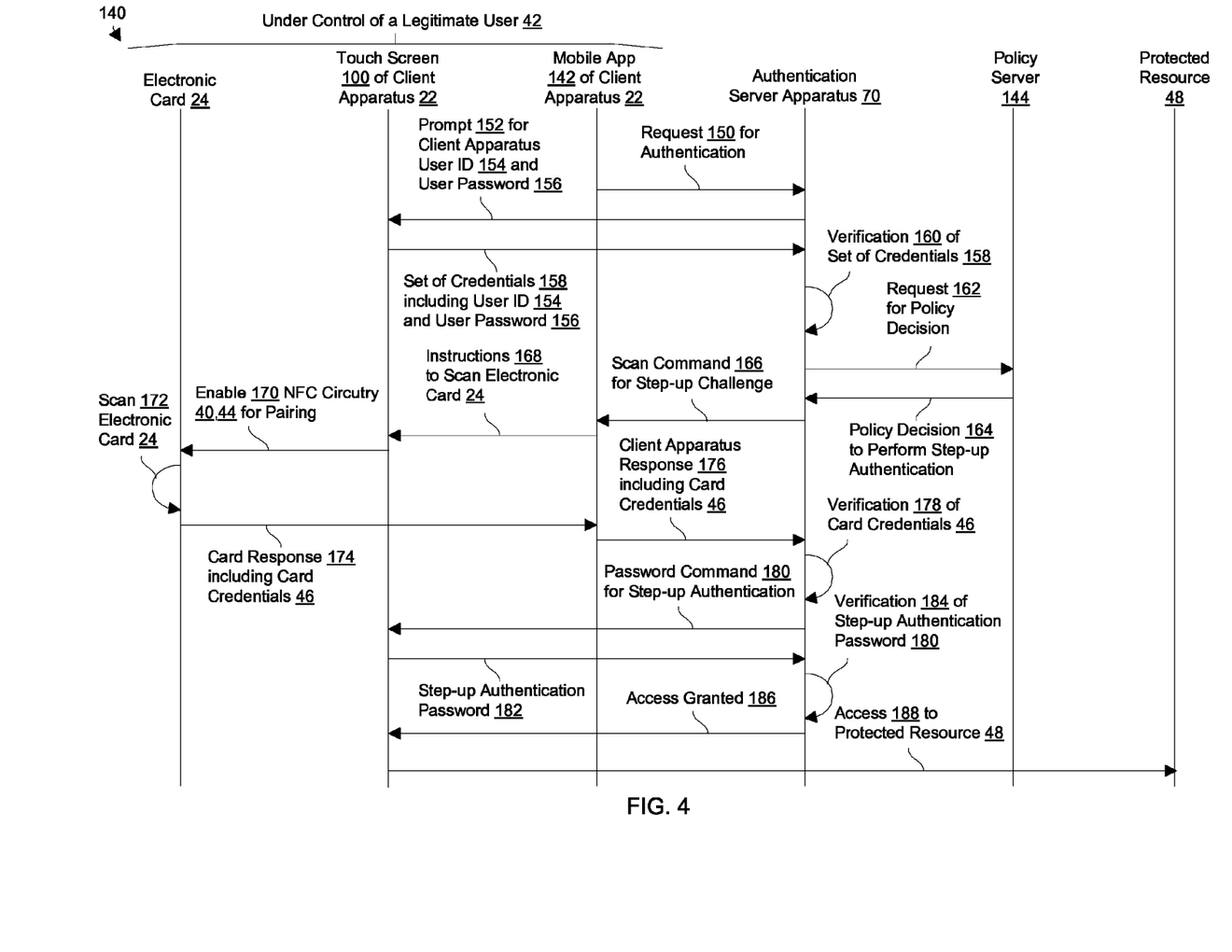
FIG. 4 is a sequence diagram illustrating particular activities that can occur within the electronic environment of FIG. 1.

FIG. 4 is a sequence diagram 140 of an example use case for controlling access to a protected resource 48 which involves the various components of the electronic environment 20 of FIG. 1. As shown in FIG. 4, the electronic card 24, the touch screen 100 of the client apparatus 22, and a mobile app 142 (or a similar user-level application) running on the client apparatus 22 are under control of a legitimate user 42. Also participating in this example use case are an authentication server apparatus 70 and a policy server 144. The policy server 144 may reside within a protected resource apparatus 26 or alternatively within an external device such as an apparatus of the authentication service equipment 28 (also see FIG. 1).

When the legitimate user 42 wishes to access the protected resource 48, the user 42 directs the mobile app 142 running on the client apparatus 22 to send a request 150 for authentication to the authentication server apparatus 70. Such activity may occur automatically in response to the user's attempt to access the protected resource 48, or in response to a manual instruction directly entered into the client apparatus 22 by the user 42.

In response to the authentication request 150, the authentication server apparatus 70 provides a prompt 152 directing the user 42 to input a user identifier 154 and a user password 156 using the touch screen 100 of the client apparatus 22. In response to the prompt 152, the user 42 instructs the client apparatus 22 to then send a set of credentials 158 which includes the user identifier 154 and the user password 156 to the authentication server apparatus 70. The set of credentials 158 may further include other authentication factors such as user biometrics, secrets or identifying parameters stored within the client apparatus 22, sensed parameters such as geolocation, collected history, and so on.

Upon receipt of the set of credentials 158, the authentication server apparatus 70 performs a verification operation 160 to verify the set of credentials 158. In some arrangements, the set of credentials 158 are fed as inputs into a risk engine which then performs risk-based authentication (or adaptive authentication). A result of such operation 160 is a risk score, i.e., a numerical value indicating an amount of riskiness that the user is not authentic.

Next, the risk score is received and evaluated by the policy server 144. In particular, the authentication server apparatus 70 sends a request 162, which includes the risk score, to the policy server 144 for a policy decision. For example, the policy server 144 can perform a normal authentication operation which compares the generated risk score to a risk score threshold to determine whether authentication is deemed successful or unsuccessful. In such a situation, if the generated risk score is less than the risk score threshold (signifying low risk that the user 42 is an imposter), the policy server 144 indicates that authentication is successful and allows the user 42 to access the protected resource 48. However, if the generated risk score is greater than the risk score threshold (signifying high risk that the user 42 is an imposter), the policy server 144 indicates that authentication is unsuccessful and takes remedial action which can be policy based.

In accordance with this example use case, suppose that the generated risk score is above the risk score threshold so that authentication is considered unsuccessful. In this situation, the policy server 144 provides a policy decision 164 back to the authentication server apparatus 70 directing the authentication server apparatus 70 to perform step-up authentication.

In response to this policy decision 164, the authentication server apparatus 70 sends a scan command 166 for a step-up challenge to the mobile app 142 of the client apparatus 22. The mobile app 142 responds to the scan command 166 by outputting instructions 102 on the touch screen 100 of the client apparatus 22 directing the user 42 to scan the electronic card 24 which is in the user's possession (also see FIG. 3A).

The user 42 follows the instructions 102 by physically moving the electronic card 24 into close proximity of the client apparatus 22 to enable 170 the NFC circuitry 40, 44 to pair and exchange useful information (also see FIG. 3B). The client apparatus 22 then scans 172 the electronic card 24 and obtains a card response 174 which includes the card credential 46 ("something that only the legitimate user has"). An example card credential 46 is a mobile payment credential provided by a mobile payment card. In turn, the client apparatus 22 returns a client apparatus response 176 which includes the card credential 46 to the authentication server apparatus 70.

Next, the authentication server apparatus 70 performs verification 178 of the card credential 46. In particular, the authentication server apparatus 70 compares the card credential 46 to an expected card credential to determine whether there is a match (also see the authentication database 86 in FIG. 2). If there is a match, there is greater certainty that the user 42 is legitimate. However, if there is not a match, the user 42 has failed to deliver an authentication factor that the user 42 should have in the user's possession.

Then, the authentication server apparatus 70 sends a password command 180 to the client apparatus 22 asking the user 42 to enter a password (also see FIG. 3C). In some arrangements, the password command 180 is sent to the authentication server apparatus 70 regardless of the result of the verification 178 of the card credential 46 to make it more difficult for a fraudster to defeat the system.

The user 42 then enters a step-up authentication password 182 which the client apparatus 22 sends to the authentication server apparatus 70. In some arrangements, the step-up authentication password 182 is different from other data which is associated with other uses of the electronic card 24 such as a PIN to complete electronic purchases or payments, a card verification value (CVV) or other payment card security code, and so on. Such differentiating of the step-up authentication password 182 from standard payment card security data prevents unnecessary exposure of that data which could otherwise weaken security.

The authentication server apparatus 70 then performs a verification operation 184 based on the step-up authentication password 182 ("something the legitimate user knows") to determine whether the user 42 is legitimate. Here, if the verification operation 184 is successful, the authentication server apparatus 70 indicates that access is granted 186 (also see FIG. 3D). Furthermore, the authentication server apparatus 70 outputs a set of access control signals to the various components of the electronic environment 20 to allow access to the protected resource 48.

Accordingly, the legitimate user 42 is then able to access 188 the protected resource 48. Furthermore detail will now be provided with reference to FIG. 5.

Figure 5:
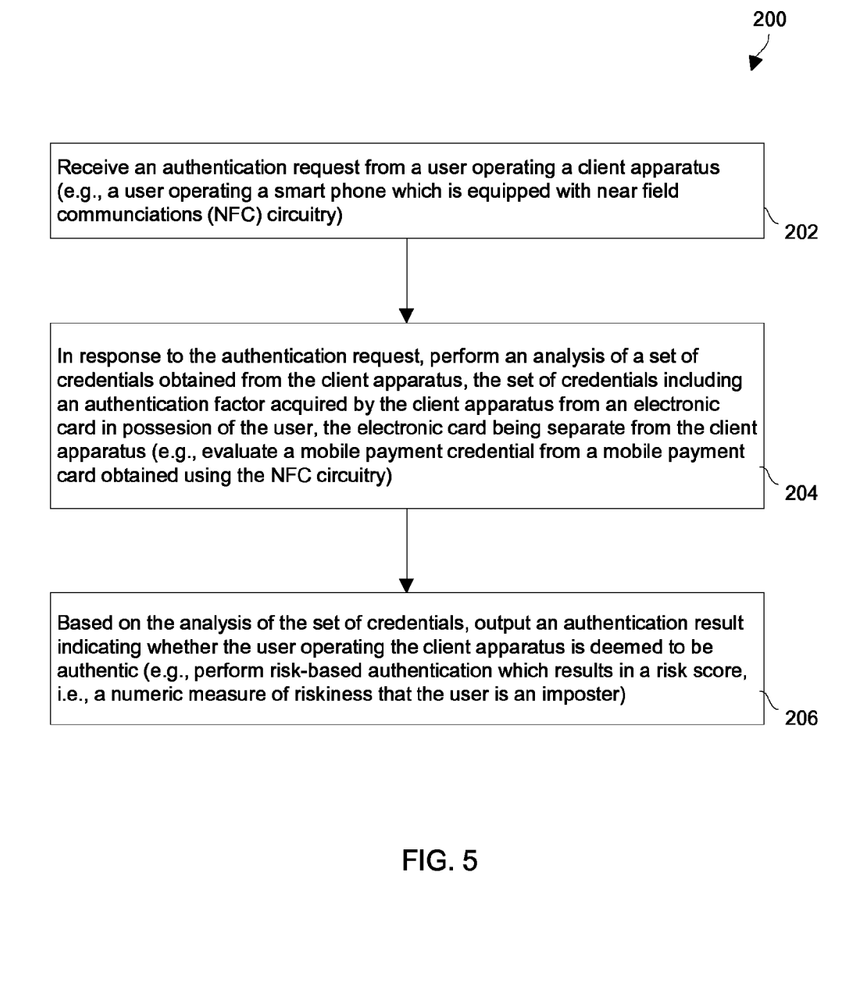
FIG. 5 is a flowchart of a procedure which is performed by the electronic environment of FIG. 1.

FIG. 5 is a flowchart of a procedure 200 which is performed by the authentication service equipment 28 when performing authentication (also see FIG. 1). Such authentication can be used to control user access to one or more protected resources 48, e.g., non-financial resource, financial resources, etc.

At 202, the authentication service equipment 28 receives an authentication request from a user 42 operating a client apparatus 22. As mentioned earlier, the client apparatus 22 can be a smart phone which is equipped with NFC circuitry 40.

At 204, in response to the authentication request, the authentication service equipment 28 performs an analysis of a set of credentials obtained from the client apparatus 22. The set of credentials includes an authentication factor acquired by the client apparatus 22 from an electronic card 24 in possession of the user 42, the electronic card 24 being separate from the client apparatus 22. For example, the authentication service equipment 28 can compare a scanned mobile payment credential from a mobile payment card with an expected mobile payment credential to determine whether the user 42 in possession of the mobile payment card is legitimate.

At 206, based on the analysis of the set of credentials, the authentication service equipment 28 outputs an authentication result indicating whether the authentication service equipment 28 deems the user 42 operating the client apparatus 22 to be authentic. Along these lines, the authentication service equipment 28 can (i) perform risk-based authentication which derives a risk score (i.e., a numeric measure of risk that the user 42 is fraudulent) and (ii) compare the risk score to a predefined threshold to determine whether authentication is successful.

If authentication is successful, the authentication service equipment 28 grants the user 42 with access to the protected resource 48. However, if authentication is unsuccessful, the authentication service equipment 28 denies access to the protected resource 48 and performs a remedial activity (e.g., a policy-based action).

It should be understood that the protected resources 48 can be provided locally by the client apparatus 22 (e.g., access to a smart phone resource of a smart phone). Alternatively, the protected resource 48 can be provided remotely by a protected resource apparatus 26 (e.g., access to remote content). In some arrangements, authentication control access to both a local protected resource 48 and a remote protected resource 48.

As described above, improved techniques are directed to authenticating a user 42 while the user operates a client apparatus 22 and possesses an electronic card 24. Such authentication is based, at least in part, on an electronic card credential which is supplied by the user 42 when the user 42 scans the electronic card 24 using the client apparatus 22. For example, during an authentication session, the user 42 may provide a device fingerprint from the client apparatus 22 (i.e., "something you are"), a personal identification number or PIN (i.e., "something you know"), and an electronic credential from an integrated circuit credit card (i.e., "something you have") to provide a significantly strong form of authentication. Moreover, use of an electronic card credential which utilizes the EMV standard (i.e., the Europay, MasterCard®, and Visa® standard for inter-operation of IC credit cards) can provide a rich and reliable mechanism for user authentication even to access protected resources of a non-financial nature.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the use of the card credential 46 was described as being used in step-up authentication by way of example only. In other use case situations, the card credential 46 is used during normal authentication (e.g., standard multi-factor authentication, normal risk-based authentication, etc.). Such modifications and enhancements are intended to belong to various embodiments of the disclosure.

What is claimed is:

1. A method of performing authentication, the method comprising:
   receiving, by processing circuitry, an authentication request from a user operating a client apparatus;
   in response to the authentication request, performing, by the processing circuitry, an analysis of a set of credentials obtained from the client apparatus, the set of credentials including an authentication factor acquired by the client apparatus from an electronic card in possession of the user, the electronic card being separate from the client apparatus; and
   based on the analysis of the set of credentials, outputting, by the processing circuitry, an authentication result indicating whether the processing circuitry deems the user operating the client apparatus to be authentic;
   wherein the client apparatus is a smart phone operated by the user, the smart phone having near field communication circuitry;
   wherein performing the analysis of the set of credentials includes:
      obtaining, as the authentication factor acquired by the client device from the electronic card, a mobile payment credential from the electronic card via the near field communication circuitry of the smart phone, and
      verifying the mobile payment credential against an expected mobile payment credential assigned to the user;
   wherein performing the analysis of the set of credentials further includes:
      prior to obtaining the mobile payment credential from the electronic card, receiving an initial set of credentials from the client apparatus and performing an initial authentication operation based on the initial set of credentials, and
      in response to a result of the initial authentication operation indicating that authentication of the user is unsuccessful and prior to obtaining the mobile payment credential from the electronic card, providing a scan command to the smart phone to direct the user to scan the electronic card using the near field communication circuitry of the smart phone; and
   wherein performing the initial authentication operation includes:
      performing, as the initial authentication operation, (i) a risk-based authentication operation using, as input, the initial set of credentials to generate a risk score, and (ii) comparing the risk score to a risk score threshold, the scan command directing the user to scan the electronic card being provided to the smart phone in response to the risk score exceeding the risk score threshold.

2. A method as in claim 1 wherein the initial set of credentials includes a user identifier which uniquely identifies the user among other users, a user password, and a set of smart phone parameters provided by the smart phone; and wherein performing the risk-based authentication operation includes:
   inputting the user identifier, the user password, and the set of smart phone parameters into a risk engine to produce, as the risk score, a numerical value indicating an amount of riskiness that the user is not authentic.

3. A method as in claim 2 wherein performing the analysis of the initial set of credentials further includes:
   after verifying the mobile payment credential against the expected mobile payment credential assigned to the user, providing a password command to the smart phone to direct the user to provide a step-up authentication password which is different from the user password, and
   comparing the step-up authentication password to an expected password to determine whether the user operating the client apparatus is authentic.

4. A method as in claim 1 wherein the electronic card is constructed and arranged to provide the mobile payment credential to point of sale apparatus in a wireless manner during in store purchases by the user; and wherein obtaining the mobile payment credential from the electronic card includes:
   acquiring the mobile payment credential from the electronic card in the wireless manner via the near field communication circuitry of the smart phone in lieu of the point of sale apparatus.

5. A method as in claim 4 wherein the processing circuitry receives the authentication request from the user in response to an attempt by the user to access a protected resource via the smart phone; and wherein the method further comprises:
   granting access to the protected resource when the authentication result indicates successful user authentication, and
   denying access to the protected resource when the authentication result indicates unsuccessful user authentication.

6. A method as in claim 5 wherein the authentication result indicates successful user authentication, and wherein granting access to the protected resource includes:
   providing the user with access to a smart phone resource contained within the smart phone.

7. A method as in claim 5 wherein the authentication result indicates successful user authentication, and wherein granting access to the protected resource includes:
   providing the user with access to a remote resource residing on a third party server which is located remotely from the smart phone.

8. An electronic apparatus, comprising:
   a network interface;
   memory; and
   processing circuitry coupled to the network interface and the memory, the memory storing instructions which, when carried out by the processing circuitry, cause the processing circuitry to:
      receive an authentication request through the network interface from a user operating a client apparatus,
      in response to the authentication request, perform an analysis of a set of credentials obtained from the client apparatus, the set of credentials including an authentication factor (i) acquired by the client apparatus from an electronic card in possession of the user and (ii) sent to the electronic apparatus from the client apparatus, the electronic card being separate from the client apparatus, and
      based on the analysis of the set of credentials, output an authentication result indicating whether the processing circuitry deems the user operating the client apparatus to be authentic;

wherein the client apparatus is a smart phone operated by the user, the smart phone having near field communication circuitry;

wherein the processing circuitry, when performing the analysis of the set of credentials, is constructed and arranged to:
  obtain, as the authentication factor acquired by the client device from the electronic card, a mobile payment credential from the electronic card via the near field communication circuitry of the smart phone, and
  verify the mobile payment credential against an expected mobile payment credential assigned to the user;

wherein the processing circuitry, when performing the analysis of the set of credentials, is further constructed and arranged to:
  prior to obtaining the mobile payment credential from the electronic card, receive an initial set of authentication factors from the client apparatus and perform an initial authentication operation based on the initial set of authentication factors, and
  in response to a result of the initial authentication operation indicating that authentication of the user is unsuccessful and prior to obtaining the mobile payment credential from the electronic card, provide a scan command to the smart phone to direct the user to scan the electronic card using the near field communication circuitry of the smart phone;

wherein the processing circuitry, when performing the initial authentication operation, is constructed and arranged to:
  perform, as the initial authentication operation, (i) a risk-based authentication operation using, as input, the initial set of authentication factors to generate a risk score, and (ii) comparing the risk score to a risk score threshold, the scan command directing the user to scan the electronic card being provided to the smart phone in response to the risk score exceeding the risk score threshold.

9. An electronic apparatus as in claim 8
wherein the initial set of authentication factors includes a user identifier which uniquely identifies the user among other users, a user password, and a set of smart phone parameters provided by the smart phone;
wherein the processing circuitry, when performing the risk-based authentication operation, is constructed and arranged to:
  input the user identifier, the user password, and the set of smart phone parameters into a risk engine to produce, as the risk score, a numerical value indicating an amount of riskiness that the user is not authentic; and
wherein the processing circuitry, when performing the analysis of the initial set of authentication factors, is further constructed and arranged to:
  after verifying the mobile payment credential against the expected mobile payment credential assigned to the user, provide a password command to the smart phone to direct the user to provide a step-up authentication password which is different from the user password, and
  compare the step-up authentication password to an expected password to determine whether the user operating the client apparatus is authentic.

10. An electronic apparatus as in claim 9 wherein the processing circuitry receives the authentication request from the user in response to an attempt by the user to access a protected resource via the smart phone; and wherein the processing circuitry is further constructed and arranged to:
  grant access to the protected resource when the authentication result indicates successful user authentication, and
  deny access to the protected resource when the authentication result indicates unsuccessful user authentication.

11. An electronic apparatus as in claim 10 wherein the electronic card is constructed and arranged to provide the mobile payment credential to point of sale apparatus in a wireless manner during in store purchases by the user; and wherein the processing circuitry, when obtaining the mobile payment credential from the electronic card, is constructed and arranged to:
  acquire the mobile payment credential from the electronic card in the wireless manner via the near field communication circuitry of the smart phone in lieu of the point of sale apparatus.

12. An electronic apparatus as in claim 10 wherein the authentication result indicates successful user authentication, and wherein the processing circuitry, when granting access to the protected resource, is constructed and arranged to:
  provide the user with access to a smart phone resource contained within the smart phone.

13. An electronic apparatus as in claim 10 wherein the authentication result indicates successful user authentication, and wherein the processing circuitry, when granting access to the protected resource, is constructed and arranged to:
  provide the user with access to a remote resource residing on a third party server which is located remotely from the smart phone.

14. A computer program product having a non-transitory computer readable medium which stores a set of instructions to perform authentication, the set of instructions, when carried out by computerized circuitry, causing the computerized circuitry to perform a method of:
  receiving an authentication request from a user operating a client apparatus;
  in response to the authentication request, performing an analysis of a set of credentials obtained from the client apparatus, the set of credentials including an authentication factor acquired by the client apparatus from an electronic card in possession of the user, the electronic card being separate from the client apparatus; and
  based on the analysis of the set of credentials, outputting an authentication result indicating whether the processing circuitry deems the user operating the client apparatus to be authentic;
  wherein the client apparatus is a smart phone operated by the user, the smart phone having near field communication circuitry;
  wherein performing the analysis of the set of credentials includes:
    obtaining, as the authentication factor acquired by the client device from the electronic card, a mobile payment credential from the electronic card via the near field communication circuitry of the smart phone, and
    verifying the mobile payment credential against an expected mobile payment credential assigned to the user;
  wherein performing the analysis of the set of credentials further includes:

prior to obtaining the mobile payment credential from the electronic card, receiving an initial set of credentials from the client apparatus and performing an initial authentication operation based on the initial set of credentials, and in response to a result of the initial authentication operation indicating that authentication of the user is unsuccessful and prior to obtaining the mobile payment credential from the electronic card, providing a scan command to the smart phone to direct the user to scan the electronic card using the near field communication circuitry of the smart phone; and wherein performing the initial authentication operation includes:

performing, as the initial authentication operation, (i) a risk-based authentication operation using, as input, the initial set of credentials to generate a risk score, and (ii) comparing the risk score to a risk score threshold, the scan command directing the user to scan the electronic card being provided to the smart phone in response to the risk score exceeding the risk score threshold.

15. A computer program product as in claim 14 wherein the electronic card is constructed and arranged to provide the mobile payment credential to point of sale apparatus in a wireless manner during in store purchases by the user; and wherein obtaining the mobile payment credential from the electronic card includes:

acquiring the mobile payment credential from the electronic card in the wireless manner via the near field communication circuitry of the smart phone in lieu of the point of sale apparatus.

16. A computer program product as in claim 15 wherein the computerized circuitry receives the authentication request from the user in response to an attempt by the user to access a protected resource via the smart phone; and wherein the method further comprises:

granting access to the protected resource when the authentication result indicates successful user authentication, and denying access to the protected resource when the authentication result indicates unsuccessful user authentication.

17. A computer program product as in claim 16 wherein the authentication result indicates successful user authentication, and wherein granting access to the protected resource includes:

providing the user with access to a smart phone resource contained within the smart phone.

18. A computer program product as in claim 16 wherein the authentication result indicates successful user authentication, and wherein granting access to the protected resource includes:

providing the user with access to a remote resource residing on a third party server which is located remotely from the smart phone.

19. A computer program product as in claim 14 wherein the initial set of credentials includes a user identifier which uniquely identifies the user among other users, a user password, and a set of smart phone parameters provided by the smart phone; and wherein performing the risk-based authentication operation includes:

inputting the user identifier, the user password, and the set of smart phone parameters into a risk engine to produce, as the risk score, a numerical value indicating an amount of riskiness that the user is not authentic.

20. A computer program product as in claim 19 wherein performing the analysis of the initial set of credentials further includes:

after verifying the mobile payment credential against the expected mobile payment credential assigned to the user, providing a password command to the smart phone to direct the user to provide a step-up authentication password which is different from the user password, and comparing the step-up authentication password to an expected password to determine whether the user operating the client apparatus is authentic.

* * * * *